United States Patent
Konradi et al.

(10) Patent No.: US 10,991,499 B2
(45) Date of Patent: Apr. 27, 2021

(54) DRIVE WAVEFORM ADJUSTMENTS TO COMPENSATE FOR TRANSDUCER RESONANT FREQUENCY

(71) Applicant: Cirrus Logic International Semiconductor Ltd., Edinburgh (GB)

(72) Inventors: Vadim Konradi, Austin, TX (US); Carl Lennart Ståhl, Malmö (SE); Rong Hu, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 260 days.

(21) Appl. No.: 16/113,765

(22) Filed: Aug. 27, 2018

(65) Prior Publication Data
US 2019/0295755 A1    Sep. 26, 2019

Related U.S. Application Data

(63) Continuation of application No. 62/646,653, filed on Mar. 22, 2018.

(51) Int. Cl.
| | |
|---|---|
| *H01F 7/06* | (2006.01) |
| *H01F 7/08* | (2006.01) |
| *G06F 3/01* | (2006.01) |
| *H01F 7/18* | (2006.01) |

(52) U.S. Cl.
CPC ............ *H01F 7/064* (2013.01); *G06F 3/016* (2013.01); *H01F 7/081* (2013.01); *H01F 7/06* (2013.01); *H01F 7/08* (2013.01); *H01F 7/18* (2013.01); *H01F 7/1844* (2013.01); *H01F 2007/185* (2013.01)

(58) Field of Classification Search
USPC ....................................................... 361/160
See application file for complete search history.

(56) References Cited

U.S. PATENT DOCUMENTS

| | | | |
|---|---|---|---|
| 9,720,503 B2 | 8/2017 | Kim et al. | |
| 2016/0063826 A1 | 3/2016 | Morrell et al. | |
| 2017/0053502 A1* | 2/2017 | Shah | G08B 6/00 |
| 2017/0169674 A1* | 6/2017 | Macours | G06F 3/016 |
| 2018/0090253 A1* | 3/2018 | Songatikamas | G06F 3/0416 |
| 2018/0159545 A1* | 6/2018 | Eke | H02P 25/032 |

OTHER PUBLICATIONS

International Search Report and Written Opinion of the International Searching Authority, International Application No. PCT/US2019/023126, dated May 31, 2019.

\* cited by examiner

*Primary Examiner* — Danny Nguyen
(74) *Attorney, Agent, or Firm* — Jackson Walker L.L.P.

(57) ABSTRACT

A method may include generating an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator. The same or another method may include generating an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator.

22 Claims, 1 Drawing Sheet

DRIVE WAVEFORM ADJUSTMENTS TO COMPENSATE FOR TRANSDUCER RESONANT FREQUENCY

RELATED APPLICATION

The present disclosure claims priority to U.S. Provisional Patent Application Ser. No. 62/646,653, filed Mar. 22, 2018, which is incorporated by reference herein in its entirety.

FIELD OF DISCLOSURE

The present disclosure relates in general to electronic devices with user interfaces, (e.g., mobile devices, game controllers, instrument panels, etc.), and more particularly, a haptic system for use in a system for mechanical button replacement in a mobile device, for use in haptic feedback for capacitive sensors, and/or other suitable applications.

BACKGROUND

Linear resonant actuators (LRAs) and other vibrational actuators (e.g., rotational actuators, vibrating motors, etc.) are increasingly being used in mobile devices (e.g., mobile phones, personal digital assistants, video game controllers, etc.) to generate vibrational feedback for user interaction with such devices. Typically, a force/pressure sensor detects user interaction with the device (e.g., a finger press on a virtual button of the device) and in response thereto, the linear resonant actuator vibrates to provide feedback to the user. For example, a linear resonant actuator may vibrate in response to force to mimic to the user the feel of a mechanical button click.

An LRA may include a mass-spring system with an electromotive actuator able to apply force to the mass, with the mass centered in a rest position by a spring or pair of springs. The mass may have embedded within it one or more permanent magnets. One or more coils of wire may apply electromagnetic force to the magnets, moving the mass. Current applied to the one or more coils of wire may cause the mass to move with respect to its housing, and vibrate therein. In typical use, an alternating voltage is applied to the coil terminals, causing an alternating current in the coil, and thus an alternating force on the mass, and the mass moves in response to the applied force. The housing may also include stops or other damping structures to limit excursion and prevent damage if the driving force is too large. As the mass vibrates within the housing, reaction forces generated by the springs and the electromotive drive may be felt as haptic sensations by a person holding the LRA or a mobile device including the LRA.

Taken together, the mass and springs of an LRA form a mechanical resonant system. For a given drive voltage, the greatest mass vibration may be achieved when the drive oscillation frequency equals the mass-spring natural or resonant frequency. In other words, resonant operation may deliver the highest vibrational acceleration per energy input.

Accordingly, a resonant buzz may be generated by synchronizing the driving signal to the LRA mass motion. This manner of synchronized drive may be accomplished by applying a drive voltage at a starting frequency, detecting movement of the mass by sensing the back-electromotive force (back-EMF), and adjusting the drive frequency to match the mass-spring natural resonant frequency. This method of driving an LRA is referred to as closed loop resonant drive. The LRA resonant frequency established in closed loop resonant drive may be stored, and a system may be configured to electrically drive a voltage waveform at a stored resonant frequency to the LRA. This alternate method of driving an LRA may be referred to as open loop resonant drive.

The resonant frequency $f_0$ of an LRA is given by the relationship:

$$f_0 = \tfrac{1}{2\pi} * \sqrt{\frac{k}{m}}$$

wherein $f_0$ is resonant frequency, k is a spring constant, expressed as force per unit distance, and m is a mass of the moving mass.

An LRA manufacturing operation will normally attempt to produce devices with minimal variation among devices, but some variation is inevitable. Spring constant variation between units is a typical cause of variation in resonant frequency $f_0$ of LRAs.

A typical LRA may be measured, and its resonance frequency used as a calibration value, which may be subsequently applied to all similar units. While such a solution may be simple, it does not accommodate for unit-to-unit resonant frequency variation. Alternatively, the resonance frequency of each individual LRA may be measured, establishing a calibrated resonance frequency for each. This measurement may take place during a dedicated calibration step, or a resonance calibration measurement may be performed periodically during the life of the LRA. Either way the calibration is performed, a representative resonant frequency for a particular LRA is established, and knowledge of this frequency permits a resonant buzz type electrical drive to be best tailored to each LRA.

Many high-performance haptic systems may drive an LRA in a non-resonant mode, energizing the mass quickly from rest to maximum energy, followed by quickly braking the mass to a stop. The entire maneuver may be only a total of a few cycles, never reaching a sinusoidal steady state. This type of short waveform drive may be referred to as a "bump" or "click." Often, the subjective feel of a haptic effect may be maximized if a control system for the LRA attempts to remove all the stored LRA mechanical energy at the end of the haptic effect, eliminating or minimizing after-ringing. Suppression of after-ringing may be achieved by applying a waveform calibrated to the LRA characteristics, intended to terminate with the LRA mass in the centered position, at zero velocity and zero displacement. A waveform matched to the LRA in this manner may be described as optimal. An optimal waveform is typically obtained from a combination of theory and experimentation.

Transient LRA drive waveforms are typically tuned with primary goals of exciting an LRA mass within its allowable excursion limits, and ensuring a clean vibration termination. There may be no single optimal waveform, and multiple optimal waveforms may be generated having properties or combinations of properties leading to desirable haptic impressions, such as strength and crispness of the haptic effect.

An LRA drive waveform may be classified into energizing, sustaining, and braking phases. During an energizing phase, energy is transmitted from the drive amplifier into the LRA, and vibration increases. During a sustaining phase, the LRA mass vibration remains at a constant level, such that energy lost to friction and electrical resistance is replaced by the amplifier, and the vibration amplitude does not change. During a braking phase, energy is extracted from the moving mass by the drive amplifier, and the vibration amplitude decreases. A short duration transient waveform may include energizing and braking phases, but may operate in sustained vibration for only a short period, or may not enter a sustaining state at all, in which case the drive transitions directly from the energizing phase to the braking phase.

During a transient LRA excitation, the vibrational state of its mass may be changed continuously from zero energy to maximum energy and back to zero. The transient drive waveform may not be generated at one fixed frequency, but instead the frequency may vary throughout the waveform. Furthermore, at any instant in time, the drive may consist of a combination of frequencies, so the transient waveform cannot be characterized as having a particular frequency.

The wave shape of an optimal transient drive waveform may be generated and co-adjusted with the LRA to yield a strong haptic effect, followed by braking and complete energy extraction at the end of the waveform to prevent after-ringing. If an optimal transient drive waveform is calibrated to a first LRA, and is then applied to a second LRA having a different resonant frequency, then the voltage waveform may be non-optimal, and will typically leave the LRA with residual after-ringing vibration upon termination of the drive waveform. Such a situation may be undesirable.

Ideally for each LRA in a production line, an optimal transient drive waveform would be co-developed to match it. However, to perform such waveform tuning, it is necessary to have precise measurement of vibration, a measurement typically done with an accelerometer. Including an accelerometer measurement procedure and waveform tuning process may not be practical in a high-volume manufacturing line.

SUMMARY

In accordance with the teachings of the present disclosure, the disadvantages and problems associated with haptic feedback in a mobile device may be reduced or eliminated.

In accordance with embodiments of the present disclosure, a method may include generating an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator.

In accordance with these and other embodiments of the present disclosure, a method may include generating an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator.

In accordance with these and other embodiments of the present disclosure, a system may include a digital signal processor configured to generate an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator and an amplifier communicatively coupled to the digital signal processor and configured to drive the target actuator in accordance with the electrical drive waveform.

In accordance with these and other embodiments of the present disclosure, a system may include a digital signal processor configured to generate an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator, and an amplifier communicatively coupled to the digital signal processor and configured to drive the target actuator in accordance with the electrical drive waveform.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to generate an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to generate an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
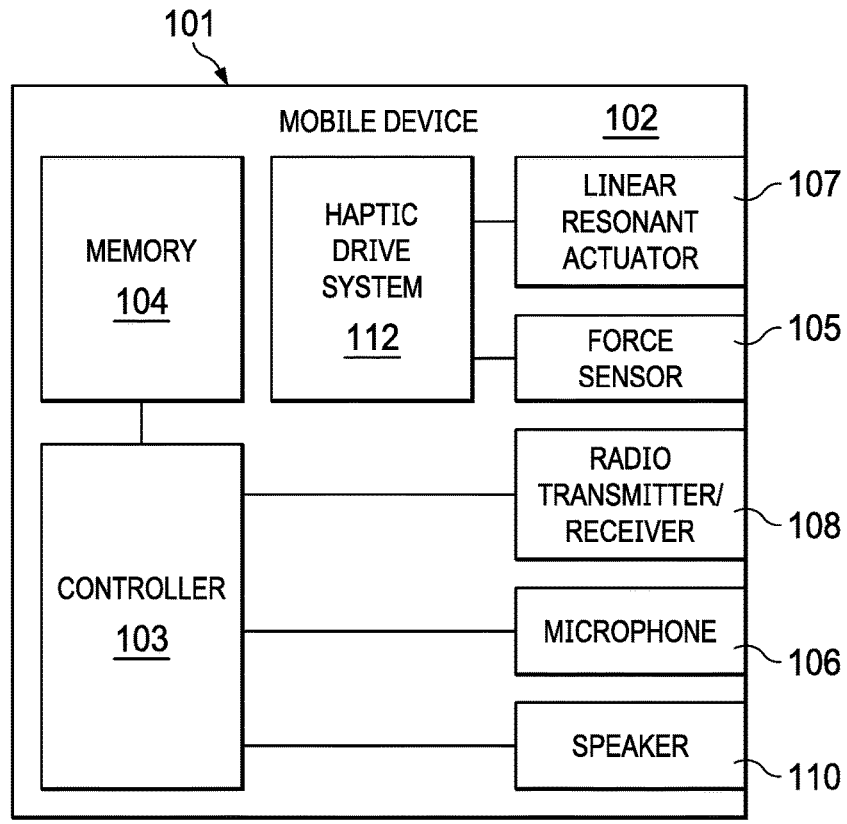
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a force sensor 105, a microphone 106, a linear resonant actuator 107, a radio transmitter/receiver 108, a speaker 110, and a haptic drive system 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 105 may be housed within enclosure 101, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given (e.g., a capacitive touch screen sensor or other capacitive sensor to which haptic feedback is provided). For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from haptic drive system 112, may render haptic feedback to a user of mobile device 102 for at least one of mechanical button replacement and capacitive sensor feedback.

Haptic drive system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102. Detail of an example integrated haptic system in accordance with embodiments of the present disclosure is depicted in FIG. 2.

Although specific example components are depicted above in FIG. 1 as being integral to mobile device 102 (e.g., controller 103, memory 104, user interface 105, microphone 106, radio transmitter/receiver 108, speaker(s) 110), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1, including but not limited to a keypad, a touch screen, and a display, thus allowing a user to interact with and/or otherwise manipulate mobile device 102 and its associated components.

Figure 2:
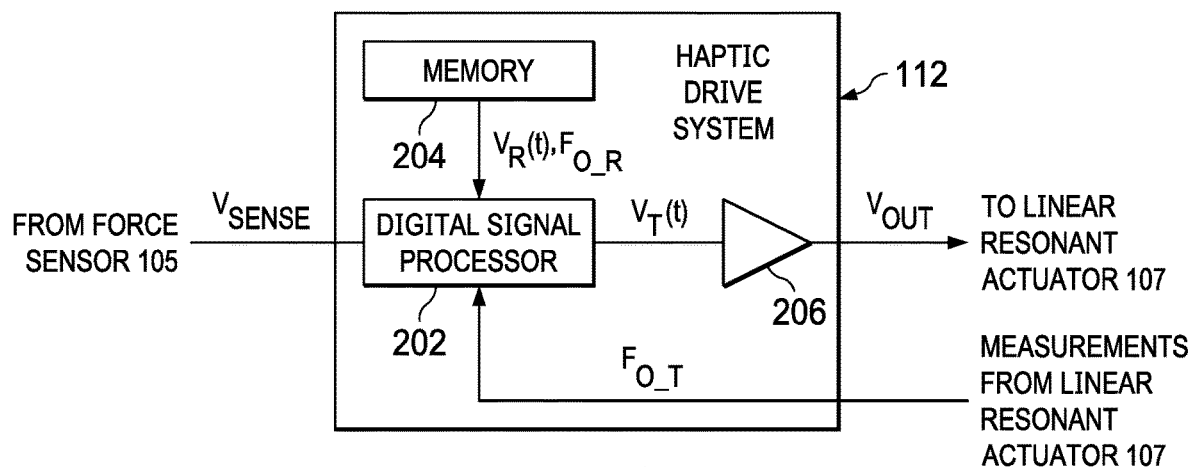
FIG. 2 illustrates a block diagram of selected components of an example haptic drive system, in accordance with embodiments of the present disclosure.

FIG. 2 illustrates a block diagram of selected components of an example haptic drive system 112, in accordance with embodiments of the present disclosure. In some embodiments, haptic drive system 112 of FIG. 2 may be used to implement haptic drive system 112 of FIG. 1. As shown in FIG. 2, haptic drive system 112 may include a digital signal processor (DSP) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off. Although FIG. 2 depicts haptic drive system 112 as having memory 204 integral thereto, in some embodiments haptic drive system 112 may not include a memory, and may instead utilize a memory external to haptic drive system 112, such as memory 104, to perform the functionality of memory 204 described herein.

Amplifier 206 may be electrically coupled to DSP 202 and may comprise any suitable electronic system, device, or apparatus configured to increase the power of an input signal $V_{IN}$ (e.g., a time-varying voltage or current) to generate an output signal $V_{OUT}$. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store a reference drive waveform $v_R(t)$. Reference drive waveform $v_R(t)$ may comprise a drive waveform optimized for use with a reference linear resonant actuator having a resonant frequency $f_{0\_R}$, which value may also be stored in memory 204. Such reference linear resonant actuator may be similar in all material respects to linear resonant actuator 107 present in mobile device 102, except for differences due to manufacturing or process variations and tolerances, such that a resonant frequency $F_{0\_T}$ of linear resonant actuator 107 (which may be referred to herein as the target resonant frequency) may vary from resonant frequency $f_{0\_R}$ of the reference linear resonant actuator in accordance with such process variations and tolerances.

Reference drive waveform $v_R(t)$ may be derived in any suitable manner, including testing and characterization of the reference linear resonant actuator, and reference resonant frequency $f_{0\_R}$ may be determined based on measurement of such reference resonant frequency $f_{0\_R}$. For example, in some embodiments, the reference linear resonant actuator may be tested and characterized to determine resonant frequency $f_{0\_R}$ and optimize of reference drive waveform $v_R(t)$ such that drive waveform $v_R(t)$ provides a desired haptic effect for the reference linear resonant actuator, and then reference drive waveform $v_R(t)$ and reference resonant frequency $f_{0\_R}$ may be stored in memory 204 of haptic drive system 112 for mobile devices employing a linear resonant actuator similar in all material respects to the reference resonant actuator other than differences due to manufacturing or process variations and tolerances.

In operation, digital signal processor 202 may, responsive to receiving an appropriate triggering signal $V_{SENSE}$ from force sensor 105 (e.g., force sensor 105 detecting user interaction with force sensor 105) generate and output a target drive waveform $v_T(t)$ which may be amplified by amplifier 206 to generate an output drive signal $V_{OUT}$ that drives linear resonant actuator 107. As described in greater detail below, digital signal processor 202 may derive target drive waveform $v_T(t)$ from reference drive waveform $v_R(t)$, modifying reference drive waveform $v_R(t)$ to generate target drive waveform $v_T(t)$ based on a difference between reference resonant frequency $f_{0\_R}$ and target resonant frequency $f_{0\_T}$. For example, digital signal processor 202 may apply one or both of time domain compensation and amplitude domain compensation to reference drive waveform $v_R(t)$ in order to generate target drive waveform $v_T(t)$.

As shown in FIG. 2, digital signal processor 202 may determine target resonant frequency $f_{0\_T}$ based on measurements of linear resonant actuator 107. For example, in some embodiments, digital signal processor 202 may continually or periodically measure target resonant frequency $f_{0\_T}$, which may vary over time due to numerous factors, including without limitation temperature, and adapt target drive waveform $v_T(t)$ as target resonant frequency $f_{0\_T}$ varies over time. However, in other embodiments, target resonant frequency $f_{0\_T}$ may simply be measured once during manufacturing or at its first start up, with the value of target resonant frequency $f_{0\_T}$ recorded in memory 204 and used for generation of target drive waveform $v_T(t)$ throughout the lifetime of haptic drive system 112 and linear resonant actuator 107.

As mentioned above, digital signal processor 202 may generate target drive waveform $v_T(t)$ by applying time domain compensation to reference drive waveform $v_R(t)$. Using time domain compensation, digital signal processor 202 may generate target drive waveform $v_T(t)$ by stretching or compressing reference drive waveform $v_R(t)$ in a time domain of reference drive waveform $v_R(t)$ in accordance with a time adjustment factor $A_T$, wherein time adjustment factor $A_T$ is determined based on a difference between target resonant frequency $f_{0\_T}$ and reference resonant frequency $f_{0\_R}$. In some embodiments, time adjustment factor $A_T$ may be equal to an arithmetic ratio equal to reference resonant frequency $f_{0\_R}$ divided by target resonant frequency $f_{0\_T}$, e.g.:

$$A_T = \frac{f_{0\_P}}{f_{0\_T}}$$

Time adjustment factor $A_T$ may represent an amount by which the time domain of target drive waveform $v_T(t)$ is adjusted with respect to time compared to reference drive waveform $v_R(t)$. For example, the relationship between target drive waveform $v_T(t)$ and reference drive waveform $v_R(t)$ may be given by:

$$V_T(A_T t) = V_P(t)$$

As mentioned above, digital signal processor 202 may, in addition to or in lieu of applying time domain compensation, generate target drive waveform $v_T(t)$ by applying amplitude domain compensation to reference drive waveform $v_R(t)$. Using amplitude domain compensation, digital signal processor 202 may generate target drive waveform $v_T(t)$ by increasing or decreasing an amplitude of reference drive waveform $v_R(t)$ in accordance with an amplitude adjustment factor $A_A$, wherein amplitude adjustment factor $A_A$ is determined based on a difference between target resonant frequency $f_{0\_T}$ and reference resonant frequency $f_{0\_R}$. In some embodiments, amplitude adjustment factor $A_A$ may be equal to an arithmetic ratio raised to an exponential power between zero and one, wherein the arithmetic ratio is equal to target resonant frequency $f_{0\_T}$ divided by reference resonant frequency $f_{0\_R}$, e.g.:

$$A_A = \left(\frac{f_{0\_T}}{f_{0\_P}}\right)^a$$

wherein the exponent $a$ is a power index such that $0 < a \leq 1$. Power index $a$ may represent an amount of amplitude correction needed that is related to resonant frequency deviation. For smaller values of power index $a$, less correction may be needed to correct for deviation in frequency than for larger values of power index $a$. The value for power index $a$ may be determined by performing calibration/characterization experiments to choose an optimal value for power index $a$ which leads to minimum vibration level variations over a set of linear resonant actuators used for characterization.

Amplitude adjustment factor $A_A$ may represent an amount by which the amplitude domain of reference drive waveform $v_R(t)$ is adjusted to generate target drive waveform $v_T(t)$. For example, the relationship between target drive waveform $v_T(t)$ and reference drive waveform $v_R(t)$ may be given by:

$$V_T(t) = A_A V_P(t)$$

As mentioned above, in some embodiments, both time domain and amplitude domain adjustment may be applied to reference drive waveform $v_R(t)$ in order to generate target drive waveform $v_T(t)$. In such embodiments target drive waveform $v_T(t)$ may be given by:

$$V_T(t) = A_A V_T'(t)$$

wherein $v_T(t)$ is a time-domain adjusted intermediate target waveform given by:

$$V_T(A_T t)' = V_P(t)$$

In some instances, the calculated amplitude adjustment to be applied to reference drive waveform $v_R(t)$ in order to generate target drive waveform $v_T(t)$ may cause overexcursion of the mass of linear resonant actuator 107. In such instances, digital signal processor 202 may disable or reduce an increase to the amplitude of the reference drive waveform in order to prevent overexcursion of mass of linear resonant actuator 107.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method, comprising:
   generating an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator.

2. The method of claim 1, wherein the time adjustment factor is equal to an arithmetic ratio equal to the resonant frequency of the reference actuator divided by the resonant frequency of the target actuator.

3. The method of claim 1, wherein the target actuator is a linear resonant actuator.

4. The method of claim 1, wherein generating the electrical drive waveform associated with the target actuator further comprises increasing or decreasing an amplitude of the reference drive waveform associated with the reference actuator in accordance with an amplitude adjustment factor, wherein the amplitude adjustment factor is determined based on the difference between a resonant frequency of the target actuator and a resonant frequency of the reference actuator.

5. The method of claim 4, wherein the amplitude adjustment factor is equal to the inverse of an arithmetic ratio raised to an exponential power between zero and one.

6. The method of claim 4, further comprising disabling or reducing an increase to the amplitude of the reference drive waveform by the amplitude adjustment factor in order to prevent overexcursion of the target actuator.

7. A method, comprising:
generating an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator.

8. The method of claim 7, wherein the amplitude adjustment factor is equal to an arithmetic ratio raised to an exponential power between zero and one, wherein the arithmetic ratio is equal to the resonant frequency of the target actuator divided by the resonant frequency of the reference actuator.

9. The method of claim 7, further comprising disabling or reducing an increase to the amplitude of the reference drive waveform by the amplitude adjustment factor in order to prevent overexcursion of the target actuator.

10. The method of claim 7, wherein the target actuator is a linear resonant actuator.

11. A system comprising:
a digital signal processor configured to generate an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator; and
an amplifier communicatively coupled to the digital signal processor and configured to drive the target actuator in accordance with the electrical drive waveform.

12. The system of claim 11, wherein the time adjustment factor is equal to an arithmetic ratio equal to the resonant frequency of the reference actuator divided by the resonant frequency of the target actuator.

13. The system of claim 11, wherein the target actuator is a linear resonant actuator.

14. The system of claim 11, wherein generating the electrical drive waveform associated with the target actuator further comprises increasing or decreasing an amplitude of the reference drive waveform associated with the reference actuator in accordance with an amplitude adjustment factor, wherein the amplitude adjustment factor is determined based on the difference between a resonant frequency of the target actuator and a resonant frequency of the reference actuator.

15. The system of claim 14, wherein the amplitude adjustment factor is equal to an inverse of an arithmetic ratio raised to an exponential power between zero and one.

16. The system of claim 14, further comprising disabling or reducing an increase to the amplitude of the reference drive waveform by the amplitude adjustment factor in order to prevent overexcursion of the target actuator.

17. A system, comprising:
a digital signal processor configured to generate an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator; and
an amplifier communicatively coupled to the digital signal processor and configured to drive the target actuator in accordance with the electrical drive waveform.

18. The system of claim 17, wherein the amplitude adjustment factor is equal to an arithmetic ratio raised to an exponential power between zero and one, wherein the arithmetic ratio is equal to the resonant frequency of the target actuator divided by the resonant frequency of the reference actuator.

19. The system of claim 17, further comprising disabling or reducing an increase to the amplitude of the reference drive waveform by the amplitude adjustment factor in order to prevent overexcursion of the target actuator.

20. The system of claim 17, wherein the target actuator is a linear resonant actuator.

21. An article of manufacture comprising:
a non-transitory computer-readable medium; and
computer-executable instructions carried on the computer-readable medium, the instructions readable by a processor, the instructions, when read and executed, for causing the processor to generate an electrical drive waveform associated with a target actuator by stretching or compressing a reference drive waveform associated with a reference actuator in a time domain of the reference drive waveform in accordance with a time adjustment factor, wherein the time adjustment factor is determined based on a difference between a resonant frequency of the target actuator and a resonant frequency of the reference actuator.

22. An article of manufacture comprising:
a non-transitory computer-readable medium; and
computer-executable instructions carried on the computer-readable medium, the instructions readable by a processor, the instructions, when read and executed, for causing the processor to generate an electrical drive waveform associated with a target actuator by increasing or decreasing an amplitude of a reference drive waveform associated with a reference actuator in accordance with an amplitude adjustment factor, wherein the amplitude adjustment factor is determined based on a difference between a resonant frequency of the target actuator and a resonant frequency of the reference actuator.

* * * * *